United States Patent
Hardcastle

(10) Patent No.: US 8,046,471 B2
(45) Date of Patent: Oct. 25, 2011

(54) REGRESSIVE TRANSPORT MESSAGE DELIVERY SYSTEM AND METHOD

(75) Inventor: Michael J. Hardcastle, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1916 days.

(21) Appl. No.: 10/247,363

(22) Filed: Sep. 19, 2002

(65) Prior Publication Data

US 2004/0059819 A1    Mar. 25, 2004

(51) Int. Cl.
    *G06F 15/16* (2006.01)
(52) U.S. Cl. ........................................ 709/227
(58) Field of Classification Search ................ 709/227
    See application file for complete search history.

(56) References Cited

U.S. PATENT DOCUMENTS

| | | |
|---|---|---|
| 5,138,653 A | 8/1992 | Le Clercq |
| 5,377,354 A | 12/1994 | Scannell et al. |
| 5,406,557 A | 4/1995 | Baudoin |
| 5,493,692 A | 2/1996 | Theimer et al. |
| 5,630,060 A | 5/1997 | Tang et al. |
| 5,634,005 A | 5/1997 | Matsuo |
| 5,657,461 A | 8/1997 | Harkins et al. |
| 5,742,668 A | 4/1998 | Pepe et al. |
| 5,748,884 A | 5/1998 | Royce et al. |
| 5,765,033 A | 6/1998 | Miloslavsky |
| 5,819,110 A | 10/1998 | Motoyama |
| 5,826,034 A | 10/1998 | Albal |
| 5,894,558 A | 4/1999 | Falker |
| 6,253,248 B1 * | 6/2001 | Nakai et al. ................... 709/237 |
| 6,285,659 B1 * | 9/2001 | Feuerstraeter et al. ........ 709/230 |
| 6,324,582 B1 * | 11/2001 | Sridhar et al. ................. 709/230 |
| 6,615,212 B1 * | 9/2003 | Dutta et al. ..................... 707/10 |
| 7,072,356 B1 * | 7/2006 | Clancy et al. .................. 370/465 |
| 2002/0022453 A1 * | 2/2002 | Balog et al. ..................... 455/41 |
| 2002/0078198 A1 * | 6/2002 | Buchbinder et al. .......... 709/224 |
| 2002/0078211 A1 * | 6/2002 | Natarajan et al. ............. 709/228 |
| 2002/0143926 A1 * | 10/2002 | Maltz et al. .................... 709/224 |
| 2002/0143929 A1 * | 10/2002 | Maltz et al. .................... 709/224 |
| 2002/0159419 A1 * | 10/2002 | Morris ............................ 370/338 |
| 2003/0023746 A1 * | 1/2003 | Loguinov ....................... 709/235 |
| 2003/0074482 A1 * | 4/2003 | Christensen et al. .......... 709/313 |
| 2003/0115317 A1 * | 6/2003 | Hickson et al. ................ 709/224 |
| 2003/0182437 A1 * | 9/2003 | Kobayashi et al. ............ 709/232 |
| 2004/0017829 A1 * | 1/2004 | Gray et al. ...................... 370/469 |
| 2008/0034382 A1 * | 2/2008 | Brown et al. ................... 719/330 |

OTHER PUBLICATIONS

High-Tech Dictionary Definition, "http://www.computeruser.com/resources/dictionary/definition.html?lookup=3220".*

* cited by examiner

*Primary Examiner* — Jerry Dennison

(57) ABSTRACT

Disclosed are systems and methods for communicating a message comprising hierarchical information with respect to a plurality of message transport mechanisms, and a plurality of transport managers adapted to communicate with the message transport mechanisms for transmission of a message to a particular destination via any one of the message transport mechanisms according to the hierarchical information.

26 Claims, 4 Drawing Sheets

_US 8,046,471 B2_

REGRESSIVE TRANSPORT MESSAGE DELIVERY SYSTEM AND METHOD

FIELD OF THE INVENTION

The present invention relates generally to communication of information and, more particularly, to message delivery systems and methods which implement regressive transport techniques.

BACKGROUND OF THE INVENTION

It is often desirable to provide for communication of information via networked systems. For example, a vendor may wish to collect information with respect to the utilization and operation of equipment deployed at a customer site. Accordingly, electronic messages may be periodically or continually formed for reporting various metrics of interest to the vendor. Such electronic messages may be communicated from the equipment at the customer site to systems at the vendor location using available network links, such as those of the Internet.

Such messages may contain statistical information, historical information, current equipment status, alarms, etcetera. Irrespective of the content of the message, it may be desirable to deliver the message to an intended destination, such as to ensure accurate statistical analysis, complete historical data, accurate picture of current status, timely response to an alarm condition, etcetera.

However, often the infrastructure of the site at which such messages are originated, e.g., the aforementioned customer site, is not reliable. For example, there may be problems with the infrastructure itself, such as connectivity problems or attacks by viruses, or problems external thereto, such as connectivity problems that affect the operation of the infrastructure. Moreover, the particular site may not provide a persistent external network connection, e.g., a persistent high speed Internet connection may not be present. Accordingly, there may be periods of time where a particular communication path or transport mechanism is not available for transmission of the aforementioned messages, thereby resulting in the failure of such messages to reach an intended destination during this period of time.

For example, utilizing a message transport mechanism typically involves making a determination as to a message transport protocol and associated transport infrastructure to be used at the time of development of the message communication system or at the time of compiling the message communication code. Accordingly, the selection of a particular message transport mechanism is fixed very early and is implemented at a very low network layer, e.g., the physical layer. Thereafter, in operation, when the selected message transport mechanism is unavailable, such as due to the failure of a server providing arbitration of the selected protocol or communication with respect to a particular port being flooded as a result of a virus attack, message transmission fails.

Additionally, the configuration of infrastructure often changes over time, perhaps implementing new transport mechanisms and/or removing old transport mechanisms. In order to utilize newly available transport mechanisms, the aforementioned systems require very low level modification to the message communication system, such as by selection of the new transport mechanism and compiling of message communication software.

BRIEF SUMMARY OF THE INVENTION

An embodiment of the invention provides a system for communicating a message comprising hierarchical information with respect to a plurality of message transport mechanisms and plurality of transport managers adapted to communicate with the message transport mechanisms for transmission of a message to a particular destination via any one of the message transport mechanisms according to the hierarchical information.

Embodiments of the invention further provide a method for providing regressive transport delivery of a message comprising establishing a hierarchy of message transport mechanisms, and providing the message to one of the message transport mechanisms for transmission to a same destination according to the hierarchy. Providing the message to one of the message transport mechanisms for transmission comprises, determining a suitability, with respect to transmission of the message, of the one of the message transport mechanisms at a time of transmission of the message, and selecting a next message transport mechanism of the hierarchy when a particular message transport mechanism is determined to be currently unsuitable with respect to transmission of the message.

Additionally, embodiments of the present invention provide a computer program product having a computer readable medium having computer program logic recorded thereon for providing regressive transport delivery of a message, the computer program product comprising hierarchical information with respect to a plurality of transport mechanisms, a process manager adapted to receive the message from a message source and to control transmission of the message according to the hierarchical information, and a plurality of transport managers adapted to communicate with the process manager to receive the message and to communicate with the message transport mechanisms for transmission of the message to the particular destination. The transport managers determine a suitability of the message transport mechanisms for transmission of the message at a time of transmission of the message.

DETAILED DESCRIPTION

Figure 1:
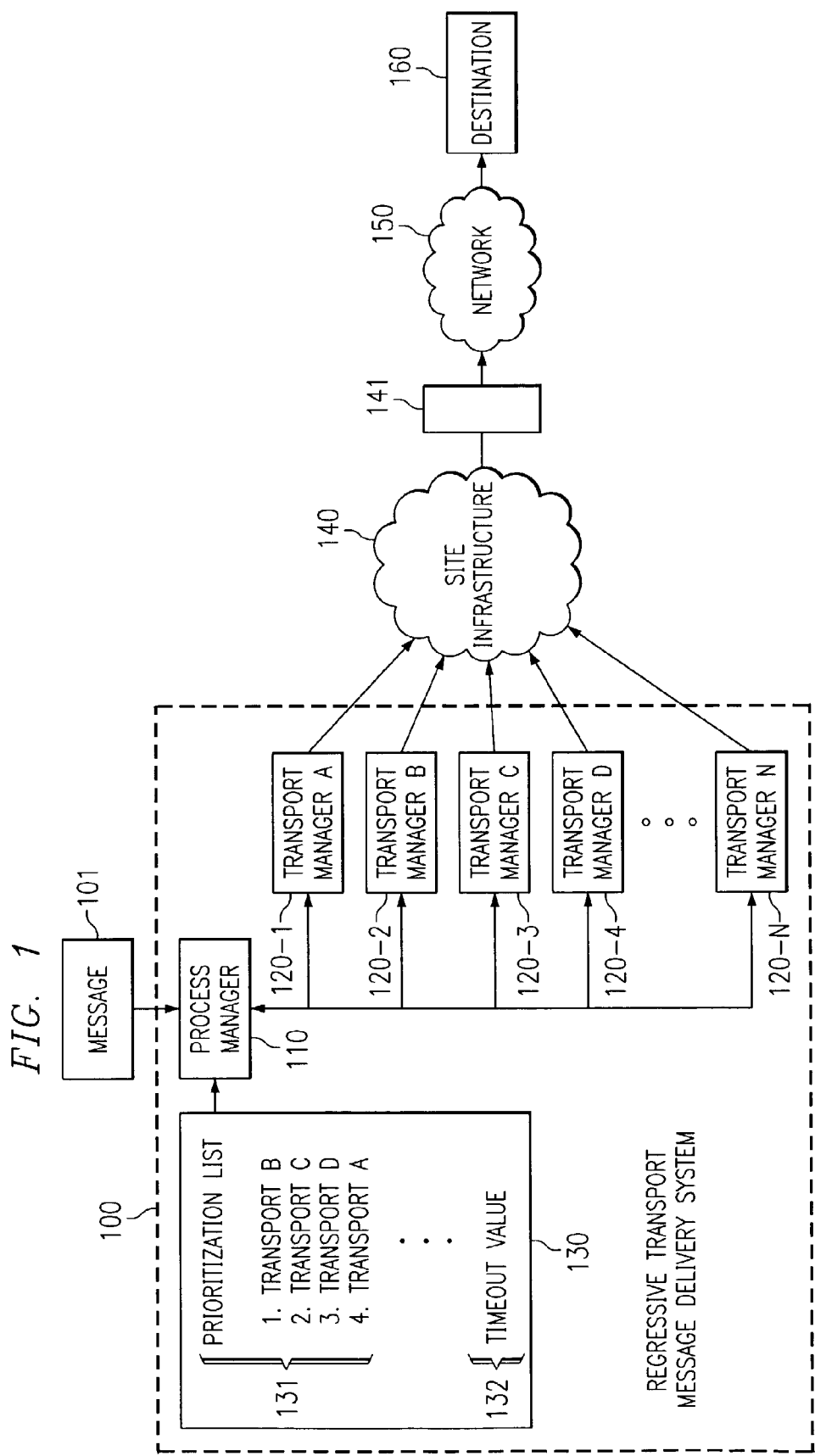
FIG. 1 shows a block diagram of a regressive transport message delivery system according to an embodiment of the present invention.

The present invention is directed to systems and methods which provide a plurality of means for transmission of messages or information. Preferably, a plurality of message transport mechanisms are implemented in a hierarchy such that particular message transport mechanisms are selected regressively, as needed. It should be appreciated that "message transport mechanisms", as set forth herein, are at the open systems interconnect (OSI) model session layer (layer 5) and above, or comprise other similarly high level protocols.

Embodiments of the present invention operate to make determinations with respect to which message transport mechanism to utilize in communicating a particular message at the time the message is to be transmitted. For example, systems of the present invention may survey particular network infrastructure, and current conditions associated therewith, at the time of message transmission to determine a most preferred message transport mechanism available for use in transmission of the message. The most preferred message transport mechanism may be that message transport mechanism which is highest in the aforementioned hierarchy and which is then available for use.

The hierarchy of message transport mechanisms may be established based upon a number of criteria. For example, a hierarchy may be established based upon the expected availability of particular network infrastructure, the network infrastructure suitable for providing most efficient communication of the messages, the type of network connection available, and/or the like. Preferably, the hierarchy is configured independently for a particular system transmitting messages, e.g., configured for a particular customer site, such as at the time of deployment. However, the hierarchy may be configured/reconfigured according to embodiments of the present invention at any point in the operation thereof and with respect to any number of systems transmitting messages.

According to an embodiment of the present invention, a process manager, preferably having a message transport prioritization list associated therewith, is provided to manage transmission of messages. Additionally, a plurality of transport managers, in communication with the process manager, may be provided to facilitate the actual transmission of messages. A particular transport manager of the aforementioned plurality of transport managers may be associated with each transmission mechanism of a plurality of transmission mechanisms suitable for message transmission according to the present invention. For example, transport managers may be provided to implement message transmission via a number of protocols, such as hypertext transfer protocol (HTTP), HTTP using a secure socket layer (HTTPS), file transfer protocol (FTP), simple mail transfer protocol (SMTP), Internet security protocol (IPSEC), etcetera, and/or using various transport systems, such as mail servers, proxy servers, socks servers, etcetera.

In operation according to a preferred embodiment, the process manager will utilize the message transport prioritization list to determine a preferred message transport mechanism for transmission of a message then to be transmitted. The process manager may then communicate the message to a corresponding one of the transport managers for performing the actual transmission of the message. The process manager will preferably monitor operation of the selected transport manager to determine of the message is successfully sent. If the selected transport manager cannot successfully transmit the message, e.g., the corresponding message transport mechanism is inoperable, the process manager may again utilize the message transport prioritization list to determine a next preferred message transport mechanism for transmission of the message. The process manager may then communicate the message to a corresponding one of the transport managers and the above cycle repeated until the message has been successfully transmitted.

Directing attention to FIG. 1, a message delivery system adapted according to a preferred embodiment of the present invention is shown. Specifically, FIG. 1 shows regressive transport message delivery system 100 of the present invention coupled to site infrastructure 140 and network 150 to facilitate delivery of message 101 to destination 160. It should be appreciated that, although shown as separate from site infrastructure 140, regressive transport message delivery system 100, or portions thereof, may be implemented on or using aspects, resources, and/or systems of site infrastructure 140.

Site infrastructure 140 may comprise systems such as network servers (e.g., mail servers, proxy servers, socks servers, database servers, etcetera), connectivity equipment (e.g., network routers, network switches, portal devices, gateway equipment, etcetera), terminal equipment (e.g., workstations, printers, scanners, etcetera), and/or the like. Moreover, although illustrated as external to the site infrastructure, site infrastructure 140 may include firewall 141 and/or other security, access, gateway, or portal apparatus. Network 150 may comprise any number of networks, such as the Internet, an intranet, the public switched telephone network (PSTN), a cable transmission system, a wireless network, a local area network (LAN), a metropolitan area network (MAN), a wide area network (WAN), and/or the like, suitable for use in communication of message 101 to destination 160.

It should be appreciated that the configuration shown in FIG. 1 is intended to be illustrative of a deployment of a message delivery system of the present invention. Accordingly, the present invention is not limited to the particular configuration illustrated, nor to the particular compositions of site equipment and/or networks set forth above.

As but one example of how regressive transport message delivery system 100 of FIG. 1 might be utilized, message 101, which might be in plain text, hypertext markup language (HTML), extensible markup language (XML) or a variety of other formats, may comprise utilization, status, and/or alarm information with respect to particular customer equipment, such as may comprise site infrastructure 140 or be coupled thereto, to be delivered to an equipment vendor at destination 160. For example, customer equipment of site infrastructure 140 may implement Computer Harvesting of Information from Peripherals™ (CHIP™) technology from Hewlett Packard Company, wherein software residing at a customer site interrogates peripherals on a customer's network and periodically forwards the collected information to a vendor electronically. It may be important to ensure delivery of such messages to desired destination, such as to ensure complete historical records are maintained, to ensure that statistical analysis is accurate, to ensure that all alarm conditions are noted and/or acted upon, etcetera.

According to a preferred embodiment, systems of regressive transport message delivery system 100 are disposed at a customer site between a source of a message to be delivered, e.g., the aforementioned CHIP software, and the message transport mechanisms available for use in delivering the message. For example, a message to be delivered using a message delivery system of the present invention may be directed to a particular port associated with the regressive transport message delivery system for management of the transmission of the message using a plurality of message transport mechanisms. Accordingly, the source of the message need not be adapted or substantially altered in order to implement regressive transport techniques of the present invention. For example, according to embodiments of the present invention, regressive transport message delivery system 100 of the present invention is adapted to accept a message using a protocol native to the source of the message, thereby allowing a relatively simple change in operating parameters of the message source (e.g., a port identified for use by the message being changed to correspond with an input port of regressive transport message delivery system 100) to facilitate operation according to the present invention.

Of course, alternative embodiments of the present invention may be configured differently than described above. For example, rather than a message being directed to regressive transport message delivery system 100, regressive transport message delivery system 100 may monitor or reconnoiter various messages, such as those directed to a particular mail server or port, and capture messages to be processed thereby for processing according to the present invention. Such messages may be identified by particular content contained therein, a particular message format or protocol, etcetera.

Although an embodiment is described above as disposed between a source of a message and message transport mechanisms useful in transmitting the message, it should be appreciated that there is no such limitation according to the present invention. For example, regressive transport message delivery functionality according to the present invention may be integrated with a message source and/or message transport mechanisms, if desired.

Figure 2:
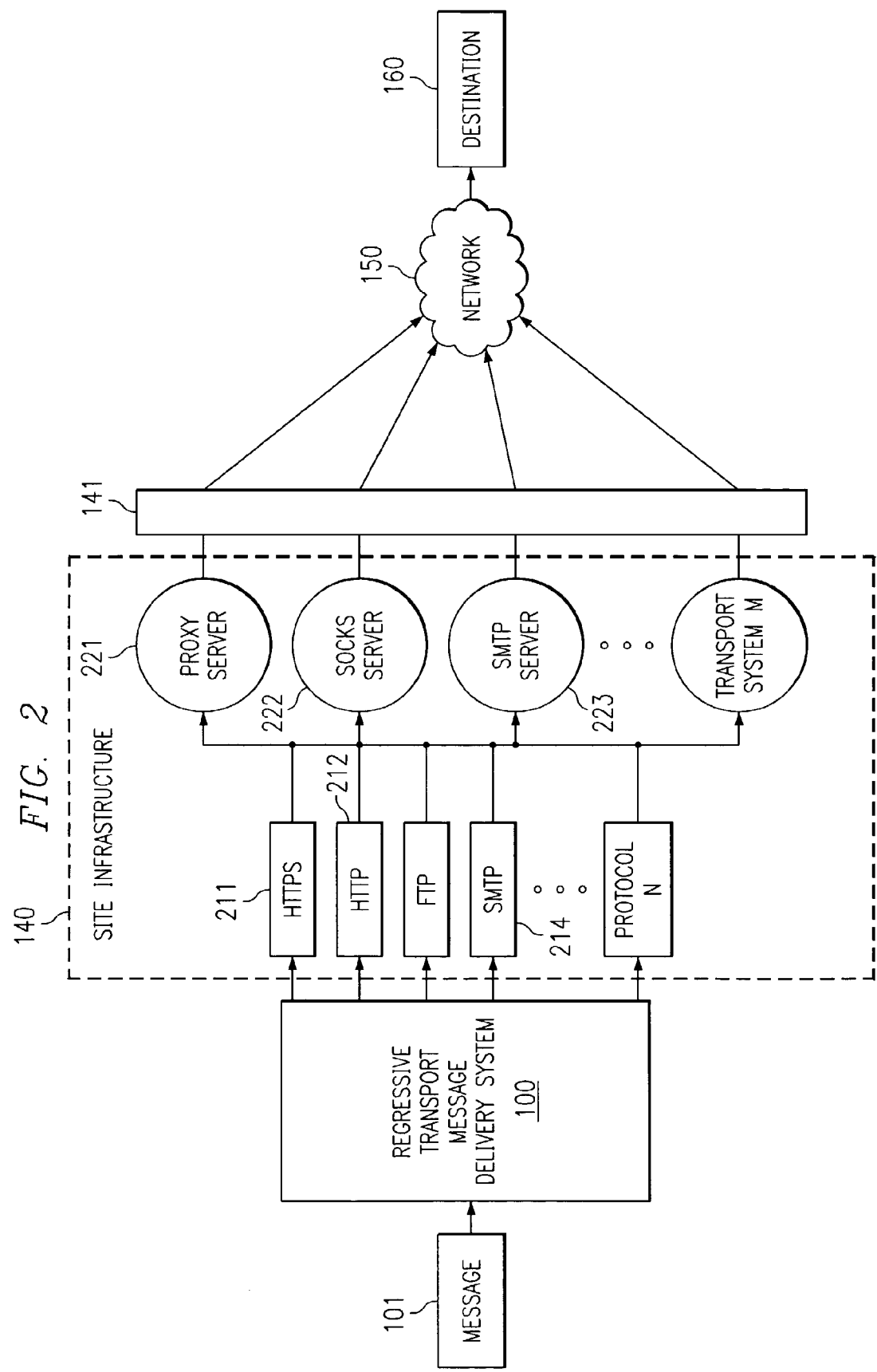
FIG. 2 shows detail with respect to interaction of the regressive transport message delivery system of FIG. 1 with site infrastructure according to an embodiment of the present invention.

Referring still to FIG. 1, the illustrated embodiment of regressive transport message delivery system 100 is shown to comprise process manager 110 in communication with transport managers 120 (specifically, transport manager A 120-1, transport manager B 120-2, transport manager C 120-3, transport manager D 120-4, and transport manager N 120-N). Transport managers 120 may be provided to facilitate the actual transmission of messages. A particular transport manager 120-1 through 120-N may be associated with each transport mechanism of a plurality of transport mechanisms (e.g., various combinations of protocols, such as HTTP, HTTPS, FTP, SMTP, IPSEC, etcetera, using various transport systems, such as mail servers, proxy servers, socks servers, etcetera) suitable for message transmission according to the present invention. Accordingly, a message for which transmission is managed according to the present invention may traverse any path of the plurality of communication paths provided by site infrastructure 140 as shown in FIG. 2. Irrespective of the particular path utilized for transmission of the message, the destination of the message preferably remains the same, e.g., destination 160.

Referring again to FIG. 1, it should be appreciated that the transport managers of the present invention may be provided in any number. For example, the number of transport managers may correspond to a number of transport mechanisms useful for transmission of a message according to the present invention included in or supported by site infrastructure 140. Alternatively, the number of transport managers may correspond to at least one transport mechanism currently not included in or supported by site infrastructure 140 in addition to a number of transport mechanisms currently included in or supported by site infrastructure 140.

Process manager 110 preferably manages transmission of a message received thereby to provide for regressive transport of the message. Accordingly, process manager 110 of the illustrated embodiment utilizes database 130 storing a message transport prioritization list 131 for establishing a message transport mechanism hierarchy.

The message transport prioritization list of database 130 may include identification of a plurality of message transport mechanisms ordered according to preference with respect to their use in transmission of a message according to the present invention. For example, a message transport prioritization list of the present invention may comprise names, aliases, addresses, and/or the like for identifying particular message transport mechanisms.

The hierarchy of message transport mechanisms set forth in a message transport prioritization list of the present invention may be established based upon a number of criteria and is, preferably, configured independently for a particular system transmitting messages. For example, site infrastructure 140 may provide for HTTPS transmission via a proxy server, HTTPS transmission via a socks server, HTTP transmission via a proxy server, and SMTP transmission via a mail server.

Where site infrastructure 140 maintains a persistent connection to network 150, it may be determined that it is most desirable to transmit messages, such as message 101, using the HTTPS/socks server message transport mechanism, somewhat less desirable to transmit messages using the HTTPS/proxy server message transport mechanism, still less desirable to transmit messages using the HTTP/proxy server message transport mechanism, and least desirable to transmit messages using the SMTP/mail server message transport mechanism. This determination may be based upon considerations such as it being most preferable to provide for secure transmission of data as well as it being preferred to achieve delivery with a minimum of delay. As SMTP provides a store and forward delivery technique, it may be identified as the least desirable transport mechanism from those listed in this scenario. Similarly, as HTTP does not provide encryption it may be identified as a next least desirable transport mechanism from those listed in this scenario, and so on.

Moreover, database 130 may comprise information, operating parameters, configuration settings, etcetera, useful according to the present invention in addition to or in the alternative to the aforementioned message transport prioritization list. For example, the illustrated embodiment of database 130 comprises timeout value information 132. Such information may be utilized in establishing a waiting period between attempts to utilize a particular message transport mechanism after that message transport mechanism has failed in transmitting a message. Additionally or alternatively, timeout value information may be utilized in establishing a waiting period between successive iterations of regressive transport message delivery attempts after all message transport mechanisms have failed in transmitting a message.

Keeping with the above example, in the message prioritization list of database 130, transport B may represent the HTTPS/socks server message transport mechanism (protocol 211 and system 222 of FIG. 2), transport C may represent the HTTPS/proxy server message transport mechanism (protocol 211 and system 221 of FIG. 2), transport D may represent the HTTP/proxy server message transport mechanism (protocol 212 and system 221 of FIG. 2), and transport A may represent the SMTP/mail server message transport mechanism (protocol 214 and system 223 of FIG. 2). Correspondingly, transport manager B 120-2 may be in communication with a HTTPS/socks server message transport mechanism of site infrastructure 140, transport manager C 120-3 may be in communication with a HTTPS/proxy server message transport mechanism of site infrastructure 140, transport manager D 120-4 may be in communication with a HTTP/proxy server message transport mechanism of site infrastructure 140, and transport manager A 120-1 may be in communication with a SMTP/mail server message transport mechanism of site infrastructure 140.

Figure 3:
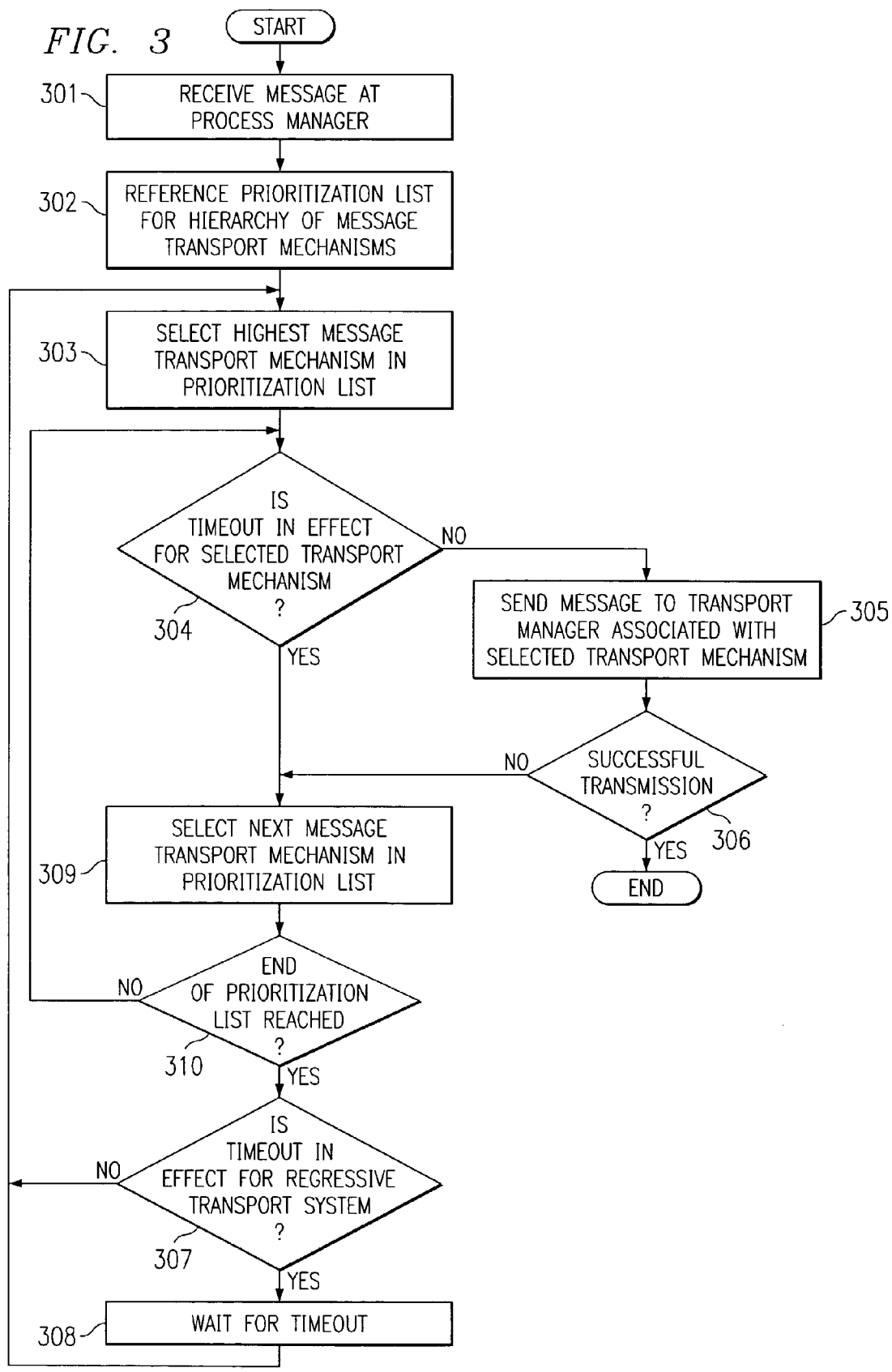
FIG. 3 shows a flow diagram of operation of a regressive transport message delivery system according to an embodiment of the present invention.

Operation according to a preferred embodiment is illustrated in the flow diagram of FIG. 3. As shown in the illustrated embodiment, process manager 110 may receive a message for delivery utilizing the regressive transport system of the present invention at step 301. Process manager may utilize the message transport prioritization list of database 130 to determine a hierarchy of message transport mechanisms at step 302. Reference to database 130 may provide further information, such as timeout values to be utilized in transmission of messages according to the present invention.

Process manager 110 may select a message transport mechanism which is highest in the hierarchy for use in transmitting the message at step 303. A determination may be made as to whether a timeout condition is in effect with respect to the selected transport mechanism at step 304. For example, the selected transport mechanism may have been the subject to a previous failed attempt to transmit this or another message. A timeout value, such as 20 minutes, may be preselected to prevent the operation of the present invention from again attempting to utilized that message transport mechanism until sufficient time has elapsed, such as to allow the message transport mechanism to be repaired, to allow a backlog of messages queued for transmission by the message transport mechanism to clear, to prevent continued pinging of the mechanism by operation of the present invention, and/or the like.

Accordingly, if a timeout condition is in effect with respect to the selected transport mechanism at step 304, processing may proceed to step 309 wherein a next message transport mechanism in the prioritization list is selected. Thereafter, at step 310, a determination may be made as to whether selection of a next message transport mechanism has resulted in the end of the prioritization list being passed. If incrementing the selected message transport mechanism in step 309 is determined to remain within the prioritization list at step 310, processing may return again to step 304. However, if incrementing the selected message transport mechanism in step 309 is determined to pass the end of the prioritization list at step 310, processing may proceed to step 307, as will be discussed in further detail below.

If a timeout condition is not in effect with respect to the selected transport mechanism at step 304, process manager 110 may communicate the message to a transport manager of transport managers 120-1 through 120-N corresponding to the selected transport mechanism at step 305. The transport manager may communicate with various systems of site infrastructure 140 for performing the actual transmission of the message. Accordingly, a transport manager of the present invention may operate to reformat a message, such as to alter the protocol of a message to correspond to that of the particular message transport mechanism. Additionally or alternatively, a transport manager of the present invention may query, or otherwise surveil or reconnoiter, systems of site infrastructure 140 associated with the corresponding message transport mechanism in order to determine if the message transport mechanism is available for message transmission according to the present invention. For example, the transport manager may determine that an associated message transport mechanism is unavailable due to a malfunction. Similarly, the transport manager may determine that an associated message transport mechanism is currently unacceptable for use according to the present invention due to a large queue of messages already waiting to be served. Moreover, determinations as to current suitability of a message transport mechanism according to the present invention may be based upon information not directly related to an associated message transport mechanism, such as determining that a particular transmission media utilized by the message transport mechanism is flooded with traffic, etcetera.

The transport manager associated with the selected message transport mechanism may provide information with respect to the transmission of the message to process manager 110. For example, a success acknowledgement may be transmitted by the transport manager to process manager 110 upon the successful transmission of the message by the selected message transport mechanism. Alternatively, a failure acknowledgement may be transmitted by the transport manager to process manager 110 if transmission of the message by the selected message transport mechanism is unsuccessful or if it is determined that the selected message transport mechanism is unavailable for message transmission according to the present invention. Accordingly, process manager 110 may make a determination as to the success of the message transmission, such as through reference to the aforementioned success/failure acknowledgements, at step 306.

If the message is determined to have been successfully transmitted at step 306 processing with respect to transmission of that message may be ended. However, if the message is determined not to have been transmitted at step 306, processing may proceed to step 309 wherein a next message transport mechanism in the prioritization list is selected as is described above. A determination may be made as to whether selection of a next message transport mechanism has resulted in the end of the prioritization list being passed at step 310 which causes processing to return to step 304 if the end of the prioritization list has not been reached or to proceed to step 307 if the end of the prioritization list has been reached.

It should be appreciated that when processing reaches step 307, that the full list of message transport mechanisms has been traversed without a successful transmission of the message. Accordingly, it may be desirable to invoke a timeout period to allow the condition or conditions causing all the message transport mechanisms not to be available for message transmission according to the present invention to be rectified. The illustrated embodiment determines if a timeout period is in effect with respect to operation of a next iteration of regressive transmission attempts according to the present invention at step 307. If a timeout period is in effect, processing proceeds to step 308 wherein further processing of the regressive transmission attempts is delayed for the timeout period. Thereafter, or if no timeout period is in effect, processing returns to step 303 for another iteration of regressive transmission attempts.

From the above, it should be appreciated that regressive transport message delivery systems of the present invention may operate to ensure delivery of a message by making determinations as to the status of message transport infrastructure at the time of message transmission. Moreover, in addition to being adapted to regressively select message transport mechanisms for use in response to such determinations, embodiments of the present invention may operate to utilize new message transport mechanisms as they come online and/or to cease to utilize old message transport mechanisms when they are taken offline.

For example, transport managers associated with a message transport mechanism not yet a part of the site infrastructure may be implemented in a regressive message transport delivery system of the present invention. The aforementioned prioritization list may include reference to the corresponding message transport mechanism, such that the transport manager is periodically called to determine if that message transport mechanism has become available. In such an embodiment, it may be desirable to set a timeout associated with a then non-implemented message transport mechanism to a value greater than that associated with a timeout for a failed, but implemented, message transport mechanism, such as to avoid unnecessarily or undesirably delaying operation of the regressive message transport system associated with continually polling a non-implemented message transport mechanism. This timeout value might be reduced, such as automatically, upon the successful transmission of a message using the message transport mechanism, effectively adding a new message transport mechanism to the regressive transport message delivery system.

Similarly, a value of a timeout associated with an originally implemented message transport mechanism may be increased if the associated transport manager is repeatedly unable transmit a message therethrough. Accordingly, an aging or decaying process might be implemented to effectively remove an old message transport mechanism that has been taken offline from the regressive transport message delivery system.

According to embodiments of the present invention, the aforementioned process manager may be a module, e.g., software modules, which may be deployed in any of a number of system configurations. For example, a process manager may be deployed with respect to a particular site infrastructure and a database populated with the aforementioned prioritization list and/or timeout values.

Similarly, the aforementioned transport managers may be substantially generic modules, e.g., software modules, which may be deployed in any of a number of system configurations. The transport managers may have configurable parameters associated therewith, such as to set a port or address to which they are to communicate messages, in order to facilitate their operation in a particular system configuration. For example, particular transport manager modules corresponding to the message transport mechanisms of a site infrastructure may be selected from a toolbox of such transport managers for deployment with respect to the site infrastructure. Thereafter, the deployed transport managers may be configured for operation in the site infrastructure by an administrator setting configurable parameters. As various message transport mechanisms are added to/deleted from site infrastructure, the appropriate transport managers may be easily added to/deleted from regressive transport message delivery systems of the present invention. Similarly, transport managers, and therefore their associated message transport mechanisms, may be enabled/disabled for use according to the present invention through alteration of the process manager database, such as to add/remove transport managers from the prioritization list and/or to adjust timeout values associated therewith.

As described above, transport managers of the present invention may each be associated with a particular message transport mechanism. However, the transport managers preferably do not duplicate the functionality of the corresponding message transport mechanism. According to embodiments of the invention, the transport managers take advantage of the existing capabilities of the message transport mechanisms of the site infrastructure. Transport managers of the present invention may manage the interaction between the process manager and the protocols and methods of getting messages out of the site infrastructure, e.g., beyond the firewall, provided by the message transport mechanisms. Accordingly, regressive transport message delivery systems of the present invention may take advantage of the open standard protocols, without adding any additional proprietary protocol requirements, to ensure delivery of messages.

Moreover, regressive transport message delivery systems of the present invention may further leverage utilization of the existing message transport infrastructure to provide for the desired communication of messages without the need for allowing for additional holes in the site infrastructure firewall. Utilization of the message transport mechanisms of the site infrastructure according to a preferred embodiment provides for the communication of messages delivered by the regressive transport message delivery system through existing ports using existing protocols etcetera.

As mentioned above, a process manager and transport managers of the present invention may be implemented in software. For example, features and functionality of the present invention may be implemented using JAVA, Version 2, ENTERPRISE EDITION (J2EE), available from Sun Microsystems, or .NET FRAMEWORK, available from Microsoft Corporation. When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 4:
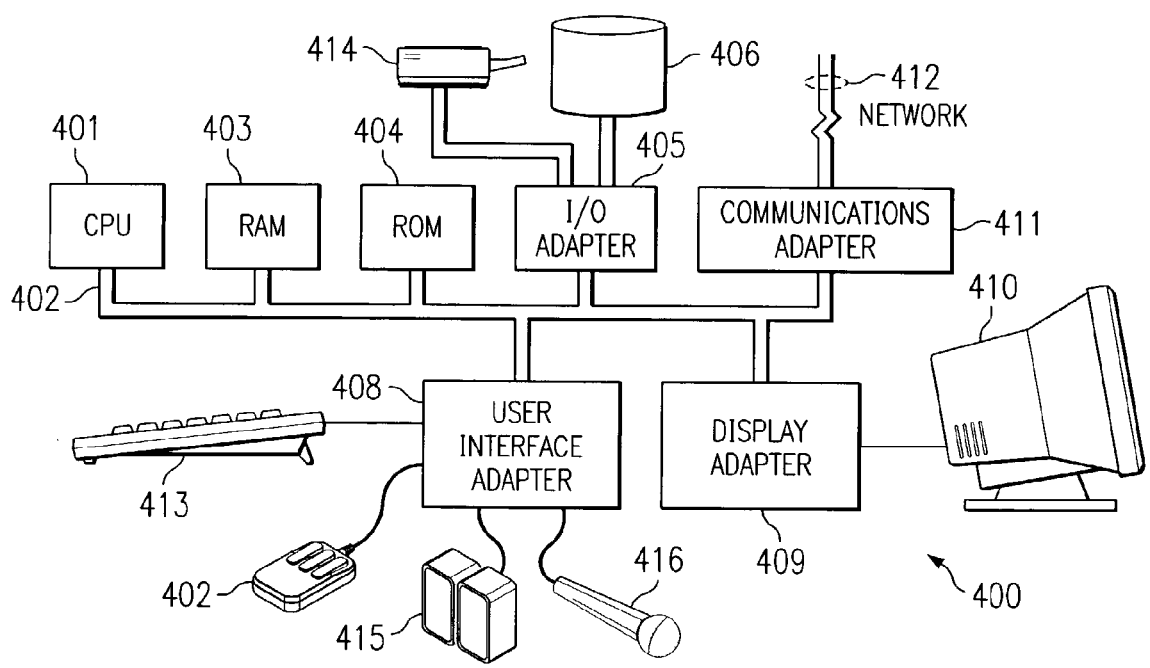
FIG. 4 shows a block diagram of a computer system which is adapted to use an embodiment of the present invention.

FIG. 4 illustrates computer system 400, such as may comprise a portion of site infrastructure 140, adapted to provide features and functionality of process manager 110 and/or transport managers 120 according to an embodiment of the present invention. Central processing unit (CPU) 401 is coupled to system bus 402. The CPU 401 may be any general purpose CPU, such as a Hewlett-Packard PA-8500 or Intel PENTIUM processor. However, the present invention is not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects to storage devices 406, such as one or more of a hard drive, a CD drive, a floppy disk drive, a tape drive, to the computer system and may provide storage of database 130 of FIG. 1. The I/O adapter 405 is also connected to printer 414, which would allow the system to print paper copies of information such as document, photographs, articles, etc. Note that the printer may be a printer (e.g. dot matrix, laser, etc.), a fax machine, or a copier machine. Communications card 411 is adapted to couple the computer system 400 to a network 412, which may comprise and/or be coupled to network 150 of FIG. 1. User interface card 408 couples user input devices, such as keyboard 413, pointing device 407, and microphone 416, to the computer system 400. User interface card 408 also provides sound output to a user via speaker(s) 415. The display card 409 is driven by CPU 401 to control the display on display device 410.

What is claimed is:

1. A system for communicating a message, said system comprising:
    a memory;
    a processor coupled to the memory;
    hierarchical information with respect to a plurality of message transport mechanisms, the hierarchical information established based on expected availability of particular network infrastructure corresponding to respective ones of the plurality of message transport mechanisms;
    a plurality of transport managers stored in the memory, executed by the processor, and adapted to communicate with said message transport mechanisms for transmission of a message to a particular destination via any one of said message transport mechanisms selected regressively from a most preferred message transport mechanism according to said hierarchical information; and timeout information associated with a particular message transport mechanism of said plurality of message transport mechanisms, a timeout of said timeout information changes in response to a corresponding transport manager detecting a failure to communicate said message by said message transport mechanism, wherein the most preferred message transport mechanism is based on availability of the particular network infrastructure corresponding to respective ones of the plurality of message transport mechanisms at a time of message transmission determined via a survey of network infrastructure and current conditions associated therewith.

2. The system of claim 1, further comprising:

a process manager in communication with said plurality of transport managers and said hierarchical information, wherein said process manager provides said message to said transport managers for transmission according to said hierarchical information.

3. The system of claim 1, wherein each transport manager of said plurality of transport managers is associated with a message transport mechanism of said plurality of message transport mechanisms.

4. The system of claim 1, wherein said plurality of transport managers comprises a transport manager associated with a message transport mechanism which is not yet active with respect to site infrastructure implementing said plurality of message transport mechanisms.

5. The system of claim 1, wherein the most preferred message transport mechanism is a highest message transport mechanisms in the hierarchical information having a corresponding particular network infrastructure that is then available to use.

6. The system of claim 1, wherein the hierarchical information is further established based on a corresponding particular network infrastructure being suitable for providing most efficient communication of messages.

7. The system of claim 1, wherein the hierarchical information is further established based on a type of network connection available for the corresponding particular network infrastructure.

8. The system of claim 1, wherein the timeout information establishes the timeout with respect to a subsequent iteration of said plurality of transport managers attempting transmission of said message according to said hierarchical information.

9. The system of claim 1, wherein the hierarchical information is further established based on ability of a message transport mechanism to achieve delivery with a minimum of delay.

10. The system of claim 1, wherein said plurality of transport mechanisms are at the open systems interconnect model session layer and above.

11. A method for providing regressive transport delivery of a message, said method comprising:

establishing a hierarchy of message transport mechanisms, the hierarchical information established based on expected availability of particular network infrastructure;

changing a timeout of timeout information associated with a particular message transport mechanism of the message transport mechanisms in response to a corresponding transport manager detecting a failure to communicate said message by said message transport mechanism:, and providing said message to a message transport mechanism selected regressively from a most preferred message transport mechanism for transmission to a same destination according to said hierarchy, wherein said providing said message to said message transport mechanisms for transmission comprises:

determining a suitability, with respect to transmission of said message, of one of said message transport mechanisms at a time of transmission of said message based on availability of the particular network infrastructure corresponding to respective ones of the plurality of message transport mechanisms determined via a survey of network infrastructure and current conditions associated therewith; and selecting a next message transport mechanism of said hierarchy when a particular message transport mechanism is determined to be currently unsuitable with respect to transmission of said message; and deploying a process manager adapted to receive said message from a message source and to control transmission of said message according to said hierarchy.

12. The method of claim 11, wherein said establishing a hierarchy of message transport mechanisms is with respect to a particular site infrastructure being suitable for providing most efficient communication of messages.

13. The method of claim 11, further comprising:

deploying at least one transport manager adapted to communicate with said process manager to receive said message and to communicate with said message transport mechanisms for transmission of said message to said destination.

14. The method of claim 13, further comprising capturing messages directed to a particular mail server or port, and process said messages to one of said message transport mechanisms selected regressively from a most preferred message transport mechanism according to said hierarchical information.

15. The method of claim 14, further comprising:

deploying a particular one of said plurality of message transport managers after a corresponding particular message transport mechanism of said plurality of message transport mechanisms is brought online; and updating said hierarchy of message transport mechanisms to include reference to said particular message transport mechanism.

16. The method of claim 14, further comprising:

deploying a particular one of said plurality of message transport managers before a corresponding particular message transport mechanism of said plurality of message transport mechanisms is brought online.

17. The method of claim 13, wherein said determining the suitability with respect to transmission of said message comprises:

monitoring, by said at least one transport manager, of an attribute associated with a corresponding message transport mechanism of said plurality of message transport mechanisms; and reporting a status with respect to said corresponding message transport mechanism to said process manager.

18. The method of claim 17, wherein said attribute associated with said corresponding message transport mechanism is indicative of the operational status of said corresponding message transport mechanism.

19. The method of claim 17, wherein said attribute associated with said corresponding message transport mechanism is not indicative of the operational status of said corresponding message transport mechanism.

20. A computer program product, comprising:
a hardware computer readable medium having computer program logic recorded thereon for providing regressive transport delivery of a message, the computer program logic comprising:
  hierarchical information with respect to a plurality of transport mechanisms, the hierarchical information established based on expected availability of particular network infrastructure corresponding to respective ones of the plurality of message transport mechanisms;
  a process manager adapted to capture messages directed to a particular mail server or port and to control transmission of said messages according to said hierarchical information;
  a plurality of transport managers adapted to communicate with said process manager to receive said messages and to communicate with said message transport mechanisms for transmission of said messages to a particular destination, wherein said transport managers determine a suitability of said ones of said message transport mechanisms for transmission of said message at a time of transmission of said messages based on availability of the particular network infrastructure corresponding to respective ones of the plurality of message transport mechanisms determined via a survey of network infrastructure and current conditions associated therewith; and
  timeout information associated with a particular message transport mechanism of said plurality of message transport mechanisms, a timeout of said timeout information changes in response to a corresponding transport manager detecting a failure to communicate said message by said message transport mechanism,
  wherein a message transport mechanisms selected regressively from a most preferred message transport mechanism according to said hierarchical information.

21. A system for communicating a message, said system comprising:
a memory;
a processor coupled to the memory;
hierarchical information with respect to a plurality of message transport mechanisms;
a plurality of transport managers stored in the memory, executed by the processor, and adapted to communicate with said message transport mechanisms for transmission of a message to a particular destination via any one of said message transport mechanisms according to said hierarchical information; and
timeout information establishing a timeout with respect to a subsequent attempt to utilize a message transport mechanism after a corresponding transport manager detects a failure to communicate said message by said message transport mechanism,
wherein a timeout of said timeout information associated with a particular message transport mechanism of said plurality of message transport mechanisms changes in response to a corresponding transport manager detecting a failure to communicate said message by said message transport mechanism.

22. The system of claim 21, wherein a timeout of said timeout information associated with a particular message transport mechanism of said plurality of message transport mechanisms is increased in response to a corresponding transport manager detecting a failure to communicate said message by said message transport mechanism.

23. The system of claim 21, wherein a timeout of said timeout information associated with a particular message transport mechanism of said plurality of message transport mechanisms is decreased in response to a corresponding transport manager detecting success in communicating said message by said message transport mechanism.

24. A method for providing regressive transport delivery of a message, said method comprising:
  establishing a hierarchy of message transport mechanisms; and
  providing said message to said message transport mechanisms for transmission to a same destination according to said hierarchy, wherein said providing said message to said message transport mechanisms for transmission comprises:
  determining a suitability, with respect to transmission of said message, of one of said message transport mechanisms at a time of transmission of said message; and
  selecting a next message transport mechanism of said hierarchy when a particular message transport mechanism is determined to be currently unsuitable with respect to transmission of said message;
  deploying a process manager adapted to receive said message from a message source and to control transmission of said message according to said hierarchy;
  establishing a timeout value associated with at least one message transport mechanism of said plurality of message transport mechanisms; and
  changing said timeout value in response to repeated determinations that said at least one message transport mechanism is unsuitable with respect to transmission of said message.

25. The method of claim 24, wherein changing said timeout value in response to repeated determinations that said at least one message transport mechanism is unsuitable with respect to transmission of said message includes enlarging said timeout value in response to repeated determinations that said at least one message transport mechanism is unsuitable with respect to transmission of said message.

26. The method of claim 24, wherein changing said timeout value in response to repeated determinations that said at least one message transport mechanism is unsuitable with respect to transmission of said message includes reducing said timeout value in response to a determination that said at least one message transport mechanism is suitable with respect to transmission of said message.

* * * * *

UNITED STATES PATENT AND TRADEMARK OFFICE
CERTIFICATE OF CORRECTION

| | | |
|---|---|---|
| PATENT NO. | : 8,046,471 B2 | Page 1 of 1 |
| APPLICATION NO. | : 10/247363 | |
| DATED | : October 25, 2011 | |
| INVENTOR(S) | : Michael J. Hardcastle | |

It is certified that error appears in the above-identified patent and that said Letters Patent is hereby corrected as shown below:

In column 11, Claim 11, line 67, delete "mechanism:," and insert -- mechanism; --, therefor.

Signed and Sealed this
Nineteenth Day of June, 2012

David J. Kappos
*Director of the United States Patent and Trademark Office*